(12) United States Patent
Hironaka et al.

(10) Patent No.: US 12,492,458 B2
(45) Date of Patent: Dec. 9, 2025

(54) STEEL SHEET

(71) Applicant: NIPPON STEEL CORPORATION, Tokyo (JP)

(72) Inventors: Satoshi Hironaka, Tokyo (JP); Mai Nagano, Tokyo (JP); Yasuhiro Ito, Tokyo (JP); Takuya Takayama, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 148 days.

(21) Appl. No.: 18/277,966

(22) PCT Filed: Feb. 25, 2022

(86) PCT No.: PCT/JP2022/007854
§ 371 (c)(1),
(2) Date: Aug. 18, 2023

(87) PCT Pub. No.: WO2022/181761
PCT Pub. Date: Sep. 1, 2022

(65) Prior Publication Data
US 2024/0124963 A1 Apr. 18, 2024

(30) Foreign Application Priority Data
Feb. 26, 2021 (JP) .................. 2021-029590

(51) Int. Cl.
*C21D 6/00* (2006.01)
*C21D 1/84* (2006.01)
(Continued)

(52) U.S. Cl.
CPC .............. *C22C 38/60* (2013.01); *C21D 1/84* (2013.01); *C21D 6/001* (2013.01); *C21D 6/002* (2013.01); *C21D 6/005* (2013.01); *C21D 6/008* (2013.01); *C21D 8/0205* (2013.01); *C21D 8/021* (2013.01); *C21D 8/0226* (2013.01); *C21D 8/0236* (2013.01); *C21D 8/0263* (2013.01);
(Continued)

(58) Field of Classification Search
None
See application file for complete search history.

(56) References Cited

U.S. PATENT DOCUMENTS

2014/0242414 A1* 8/2014 Minami ................ C22C 38/001
148/333

FOREIGN PATENT DOCUMENTS

JP 2005-220430 A 8/2005
JP 2007-070659 A 3/2007

* cited by examiner

*Primary Examiner* — Elizabeth Collister
(74) *Attorney, Agent, or Firm* — Birch, Stewart, Kolasch & Birch, LLP

(57) ABSTRACT

An objective of the present invention is to provide a steel sheet having a high strength which can provide excellent appearance quality. The steel sheet has a chemical composition including, in mass %, C: more than 0.030% to 0.145%, Si: 0% to 0.500%, Mn: 0.50% to 2.50%, P: 0% to 0.100%, S: 0% to 0.020%, Al: 0% to 1.000% or less, N: 0% to 0.0100%, and the like, wherein a metal micro-structures consisting of 70 to 95% of ferrite in volume fraction and 5 to 30% of hard phases in volume fraction, and a value X1 obtained by dividing a standard deviation of average Mn concentrations in a rolling direction at ¼ sheet-thickness positions in a sheet thickness direction by an average Mn concentration at the ¼ sheet-thickness positions is 0.025 or less.

10 Claims, 3 Drawing Sheets

(51) Int. Cl.
    *C21D 8/02*    (2006.01)
    *C21D 9/46*    (2006.01)
    *C22C 38/00*   (2006.01)
    *C22C 38/02*   (2006.01)
    *C22C 38/04*   (2006.01)
    *C22C 38/06*   (2006.01)
    *C22C 38/08*   (2006.01)
    *C22C 38/12*   (2006.01)
    *C22C 38/14*   (2006.01)
    *C22C 38/16*   (2006.01)
    *C22C 38/22*   (2006.01)
    *C22C 38/24*   (2006.01)
    *C22C 38/28*   (2006.01)
    *C22C 38/32*   (2006.01)
    *C22C 38/38*   (2006.01)
    *C22C 38/60*   (2006.01)
    *C23C 2/28*    (2006.01)

(52) U.S. Cl.
    CPC ............. *C21D 8/0278* (2013.01); *C21D 9/46* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/22* (2013.01); *C22C 38/24* (2013.01); *C22C 38/28* (2013.01); *C22C 38/32* (2013.01); *C22C 38/38* (2013.01); *C21D 2211/005* (2013.01); *C23C 2/285* (2013.01)

STEEL SHEET

TECHNICAL FIELD

The present invention relates to a steel sheet.

BACKGROUND ART

From the viewpoint of the conservation of the global environment, for automobiles, there are needs of weight reduction on not only structural components such as members but also panel components such as a roof or a door outer panel, for the improvement of fuel efficiency. Unlike skeleton components, these panel components are required to have high appearance quality because the panel components come to one's notice. The appearance quality can include designability and surface quality.

Patent Document 1 discloses a high-strength hot-dip zinc-coated steel sheet that is excellent in surface quality. Specifically, Patent Document 1 discloses a high-strength hot-dip zinc-coated steel sheet contains, in mass %, C: 0.02 to 0.20%, Si: 0.7% or less, Mn: 1.5 to 3.5%, P: 0.10% or less, S: 0.01% or less, Al: 0.1 to 1.0%, N: 0.010% or less, and Cr: 0.03 to 0.5%, an in-annealing surface oxidation index A defined by a formula: A=400Al/(4Cr+3Si+6Mn), which includes contents of Al, Cr, Si, and Mn as items having the respective symbols, being 2.3 or more, with the balance being Fe and unavoidable impurities, wherein micro-structures of the steel sheet (substrate) consist of ferrite and second phases, and the high-strength hot-dip zinc-coated steel sheet includes the steel sheet (substrate) in which the second phases are mainly of martensite and a hot-dip galvanized layer on a surface of the substrate.

LIST OF PRIOR ART DOCUMENTS

Patent Document

Patent Document 1: JP2005-220430A

SUMMARY OF INVENTION

Technical Problem

To improve the appearance quality, a challenge is to prevent the production of ghost lines. Ghost lines refer to minute unevenness that is produced on the order of 1 mm on a surface of a steel sheet that includes hard phases and soft phases, such as of a dual phase (DP) steel, by peripheries of the soft phases being preferentially deformed when the steel sheet is subjected to press forming. The unevenness is produced in streaky lines on the surface, and therefore, a press-formed item with ghost lines produced is poor in appearance quality.

As the panel components are increased in strength, reduced in thickness for the weight reduction of automobiles, and made more complex in shape, a surface of the steel sheet after the forming tends to produce unevenness and tends to produce ghost lines.

The present invention has been made in the above circumstances. An objective of the present invention is to provide a steel sheet having a high strength and provides excellent appearance quality.

Solution to Problem

The present invention has a gist of a steel sheet described below.

(1) A steel sheet including a chemical composition consisting of, in mass %:
C: more than 0.030% to 0.145%,
Si: 0% to 0.500% or less,
Mn: 0.50% to 2.50%,
P: 0% to 0.100% or less,
S: 0% to 0.020% or less,
Al: 0% to 1.000% or less,
N: 0% to 0.0100% or less,
B: 0% to 0.0050%,
Mo: 0% to 0.800%,
Ti: 0% to 0.200%,
Nb: 0% to 0.100%,
V: 0% to 0.200%,
Cr: 0% to 0.800%,
Ni: 0% to 0.250%,
O: 0% to 0.0100%,
Cu: 0% to 1.00%,
W: 0% to 1.00%,
Sn: 0% to 1.00%,
Sb: 0% to 0.200%,
Ca: 0% to 0.0100%,
Mg: 0% to 0.0100%,
Zr: 0% to 0.0100%, and
REM: 0% to 0.0100%,
with the balance being Fe and impurities, wherein
a metal micro-structures consisting of 70 to 95% of ferrite in volume fraction and 5 to 30% of hard phases in volume fraction, and
a value X1 obtained by dividing a standard deviation of average Mn concentrations in a rolling direction at ¼ sheet-thickness positions in a sheet thickness direction by an average Mn concentration at the ¼ sheet-thickness positions is 0.025 or less.

(2) The steel sheet according to (1) above, wherein a value X2 obtained by dividing a standard deviation of average Mn concentrations in a rolling direction at a ½ sheet-thickness positions in the sheet thickness direction by an average Mn concentration at the ½ sheet-thickness positions is 0.035 or less.

(3) The steel sheet according to (1) or (2) above, wherein an area of hard phases connected together by 100 μm or more in the rolling direction is 30% or less of area of all hard phases in a region between ¼ sheet-thickness positions and a ½ sheet-thickness position.

(4) The steel sheet according to any one of (1) to (3) above, wherein an average grain diameter of the ferrite is 5.0 to 30 μm, and an average grain diameter of the hard phases is 1.0 to 5.0 μm.

(5) The steel sheet according to any one of (1) to (4) above, wherein a value Z1 obtained by dividing a difference between a maximum and a minimum of the average Mn concentrations in the rolling direction at the ¼ sheet-thickness positions in the sheet thickness direction by the average Mn concentration at the ¼ sheet-thickness positions is 0.110 or less.

(6) The steel sheet according to any one of (1) to (5) above, wherein a value Z2 obtained by dividing a difference between a maximum and a minimum of the average Mn concentrations in the rolling direction at the ½ sheet-thickness positions in the sheet thickness direction by the average Mn concentration at the ½ sheet-thickness positions is 0.150 or less.

(7) The steel sheet according to any one of (1) to (6) above, wherein the hard phases consist of any one or more of martensite, bainite, tempered martensite, and pearlite.

(8) The steel sheet according to any one of (1) to (7) above, wherein a sheet thickness of the steel sheet is 0.20 mm to 1.00 mm.

(9) The steel sheet according to any one of (1) to (8) above, wherein the steel sheet is an automobile skin panel.

Advantageous Effects of Invention

The aspects according to the present invention, a steel sheet having a high strength which can provide excellent appearance quality can be provided.

DESCRIPTION OF EMBODIMENTS

Circumstances of Conceiving the Present Invention

Figure 1:
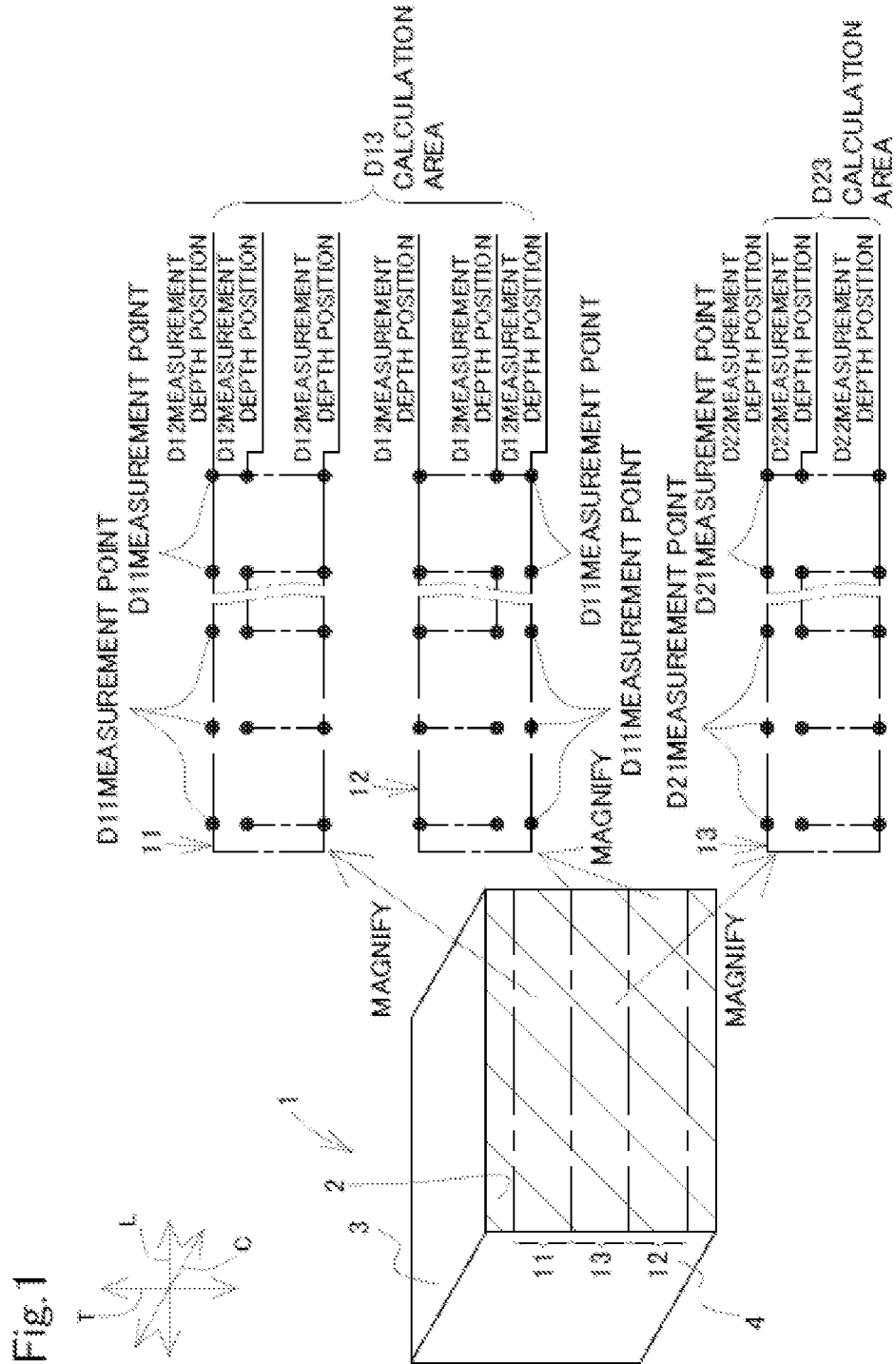
FIG. 1 is a schematic diagram for describing values that are obtained by dividing standard deviations of average Mn concentrations in a rolling direction at ¼ sheet-thickness positions and a ½ sheet-thickness positions of the steel sheet in a sheet thickness direction by the average Mn concentrations at the corresponding ¼ sheet-thickness positions and the corresponding ½ sheet-thickness positions, respectively.

The present inventors investigated a method for preventing ghost lines from being produced after subjecting a high-strength steel sheet to press forming. As mentioned above, in a steel sheet in which hard phases and soft phases are intermixed, such as dual phase (DP) steel, peripheries of the soft phases may be deformed to produce minute unevenness on surfaces of the steel sheet, resulting in an appearance defect called ghost line. The ghost lines are produced in a band shape (band pattern) by a deformation in the press forming of the steel sheet in which the soft phases depresses while the hard phases do not depress or rise to be convex.

As seen from the above, ghost lines are produced by the presence of hard phases connected together in a band shape. Based on this finding, the present inventors conceived an idea that it is important to disperse hard phases evenly (prevent banded microstructures from being produced) to reduce a ghost line on a DP steel according to the present embodiment, for example. The banded microstructures are produced by center segregation and microsegregation of Mn when the steel is solidified, and thus, to prevent the production, it is necessary to prevent Mn segregation when the steel is solidified.

As a result of diligent studies, the inventors of the present application came to pay attention to a technique of rolling a slab immediately after solidified (grain refining by direct rolling after solidification method), as an approach for reducing the Mn segregation in the steel. The present inventors discovered that performing grain refining by direct rolling after solidification reduces the Mn segregation, particularly microsegregation of Mn at ¼ positions in a sheet thickness direction, thus decreasing a ratio of hard phases connected together. The present inventors found that a surface roughness of the steel sheet after the forming consequently becomes more satisfactory.

The present invention has been made based on the findings. A steel sheet according to the present embodiment will be described below in detail. Note that the present invention is not limited only to the configuration disclosed in the present embodiment and various modifications may be made without departing from the scope of the present invention.

First, a chemical composition of the steel sheet according to the present embodiment will be described. Each of the following ranges limited by numerical values to be described below with "to" between the numerical values includes its lower limit value and its upper limit value. When the numerical values are indicated with "less than" or "more than", the numerical values are not included in the range. In the following description, percent relating to the chemical composition refers to mass percent unless otherwise particularly stated.

A steel sheet according to the present embodiment includes a chemical composition consisting of, in mass %:
C: more than 0.030% to 0.145%,
Si: 0% to 0.500%,
Mn: 0.5% to 2.50%,
P: 0% to 0.100%,
S: 0% to 0.020%,
Al: 0% to 1.000%,
N: 0% to 0.0100%,
B: 0% to 0.0050%,
Mo: 0% to 0.800%,
Ti: 0% to 0.200%,
Nb: 0% to 0.100%,
V: 0% to 0.200%,
Cr: 0% to 0.800%,
Ni: 0% to 0.250%,
O: 0% to 0.0100%,
Cu: 0% to 1.00%,
W: 0% to 1.00%,
Sn: 0% to 1.00%,
Sb: 0% to 0.200%,
Ca: 0% to 0.0100%,
Mg: 0% to 0.0100%,
Zr: 0% to 0.0100%, and
REM: 0% to 0.0100%,
with the balance being Fe and impurities. The elements will be described below.

(C: More than 0.030% to 0.145%)

C (carbon) is an element that increases a strength of the steel sheet. To obtain a desired strength, a content of C is set to more than 0.030%. For further increasing the strength, the content of C is preferably 0.035% or more, more preferably 0.040% or more, still more preferably 0.050% or more, and even still more preferably 0.060% or more.

By setting a content of C to 0.145% or less, the diffusion of Mn in the solidification is accelerated, which can prevent banded Mn segregation from becoming likely to occur. As a result, the production of ghost lines after press forming of the steel sheet can be prevented. For that reason, the content of C is set to 0.145% or less. The content of C is preferably 0.110% or less, and more preferably 0.090% or less.

(Si: 0% to 0.500%)

Si (silicon) is a deoxidizing element for the steel and is an element that is effective in increasing the strength of the steel sheet without loss of a ductility of the steel sheet. By setting a content of Si to 0.500% or less, the occurrence of a surface defect due to a decrease in scale peeling properties can be prevented. The content of Si is therefore set to 0.500% or less. The content of Si is preferably 0.250% or less, and more preferably 0.100% or less.

A lower limit of the content of Si includes 0%, but the content of Si may be set to 0.0005% or more or 0.0010% or more to improve a strength-formability balance of the steel sheet.

(Mn: 0.50% to 2.50%)

Mn (manganese) is an element that increases a hardenability of steel, contributing to the improvement of a strength of the steel. To obtain a desired strength, a content of Mn is set to 0.50% or more. The content of Mn is preferably 1.20% or more, more preferably 1.40% or more.

When the content of Mn is 2.50% or less, the occurrence of the Mn segregation in a band pattern can be prevented when the steel is solidified. The content of Mn is therefore set to 2.50% or less. The content of Mn is preferably 2.00% or less, and more preferably 1.80% or less.

(P: 0% to 0.100%)

P (phosphorus) is an element that embrittles the steel. When a content of P is 0.100% or less, the steel sheet can be prevented from being embrittled to be easily broken in a production step. The content of P is therefore set to 0.100% or less. The content of P may be 0.070% or less, 0.040% or less, 0.030% or less, or 0.020% or less.

A lower limit of the content of P includes 0%, but by setting the content of P to 0.001% or more, the production cost can be further reduced. The content of P therefore may be set to 0.001% or more.

(S: 0% to 0.020%)

S (sulfur) forms a Mn sulfide, thus being an element that degrades formabilities of the steel sheet such as ductility, hole-expansion properties, stretch flangeability, and bendability. When a content of S is 0.020% or less, a significant decrease in the formabilities of the steel sheet can be prevented. The content of S is therefore set to 0.020% or less. The content of S is preferably 0.010% or less, and more preferably 0.008% or less.

A lower limit of the content of S includes 0%, but by setting the content of S to 0.0001% or more, the production cost can be further reduced. The content of S therefore may be set to 0.0001% or more.

(Al: 0% to 1.000%)

Al (aluminum) is an element that functions as a deoxidizer, thus being an element that is effective in increasing the strength of the steel. By setting a content of Al to 1.000% or less, a castability of the steel sheet can be increased, and in turn, a productivity of the steel sheet can be increased. The content of Al is therefore set to 1.000% or less. The content of Al is preferably 0.650% or less, and more preferably 0.600% or less. A lower limit of the content of Al includes 0%, but the content of Al may be set to 0.005% or more to provide a deoxidation effect by Al sufficiently.

(N: 0% to 0.0100%)

N (nitrogen) forms nitrides, thus being an element that degrades formabilities of the steel sheet such as ductility, hole-expansion properties, stretch flangeability, and bendability. When a content of N is 0.0100% or less, excessive formation of the nitrides is avoided, which can increase the formabilities of the steel sheet such as ductility, hole-expansion properties, stretch flangeability, and bendability, and additionally, weld defects during welding can be reduced, which can increase the productivity of the steel sheet. The content of N is therefore set to 0.0100% or less. The content of N is preferably 0.0080% or less, and more preferably 0.0070% or less.

A lower limit of the content of N includes 0%, but setting the content of N to 0.0005% or more, the production cost can be further reduced. The content of N therefore may be set to 0.0005% or more.

The steel sheet according to the present embodiment may contain the elements described below as optional elements. When each of the optional elements is not contained, a content of the optional element is 0%.

(B: 0% to 0.0050%)

B (boron) is an element that prevents phase transformation at high temperatures, contributing to the improvement of the strength of the steel sheet. B need not necessarily be contained, and therefore a lower limit of a content of B includes 0%. To sufficiently provide the advantageous effect of improving the strength brought by B, the content of B is preferably 0.0005% or more, and more preferably 0.0010% or more.

When the content of B is 0.0050% or less, a decrease in the strength of the steel sheet due to the production of B precipitates can be prevented. The content of B is therefore set to 0.0050% or less. The content of B may be 0.0001% to 0.0050%.

(Mo: 0% to 0.800%)

Mo (molybdenum) is an element that prevents phase transformation at high temperatures, contributing to the improvement of the strength of the steel sheet. Mo need not necessarily be contained, and therefore a lower limit of a content of Mo includes 0%. To sufficiently provide the advantageous effect of improving the strength brought by Mo, the content of Mo is preferably 0.050% or more, and more preferably 0.100% or more.

Further, when the content of Mo is 0.800% or less, a decrease in the productivity due to a decrease in hot workability can be prevented. The content of Mo is therefore set to 0.800% or less. The content of Mo may be 0.001% to 0.800% or may be 0 to 0.40%.

Note that a chemical composition including both Cr: 0.200 to 0.800% and Mo: 0.050 to 0.800% enables the strength of the steel sheet to be further improved reliably and is thus preferable.

(Ti: 0% to 0.200%)

Ti (titanium) is an element that has an effect of reducing amounts of S, N, and O (oxygen), which produce coarse inclusions serving as an origin of fracture. Ti has an effect of refining micro-structures, increasing the strength-formability balance of the steel sheet. Ti need not necessarily be contained, and therefore a lower limit of a content of Ti includes 0%. To sufficiently provide the effects, the content of Ti is preferably set to 0.001% or more, and more preferably 0.010% or more.

Further, when the content of Ti is 0.200% or less, the formation of coarse Ti sulfide, Ti nitride, and Ti oxide can be prevented, which enables the steel sheet to have high formabilities. The content of Ti is therefore set to 0.200% or less. The content of Ti is preferably 0.080% or less, and more preferably 0.060% or less. The content of Ti may be 0 to 0.100% or may be 0.001% to 0.200%.

(Nb: 0% to 0.100%)

Nb (niobium) is an element that brings about strengthening by its precipitates, grain refinement enhancing by preventing the growth of ferrite grains, and dislocation enhancing by preventing recrystallization, thus contributing to the improvement of the strength of the steel sheet. Nb need not necessarily be contained, and therefore a lower limit of a content of Nb includes 0%. To sufficiently provide the effect, the content of Nb is preferably set to 0.005% or more, and more preferably 0.010% or more.

Further, when the content of Nb is 0.100% or less, recrystallization is promoted, which can prevent unrecrystallized ferrite from remaining, thus enabling the steel sheet to have high formabilities. The content of Nb is therefore set to 0.100% or less. The content of Nb is preferably 0.050% or less, and more preferably 0.040% or less. The content of Nb may be 0.001% to 0.100%.

(V: 0% to 0.200%)

V (vanadium) is an element that brings about strengthening by its precipitates, grain refinement enhancing by preventing the growth of ferrite grains, and dislocation enhancing by preventing recrystallization, thus contributing to the improvement of the strength of the steel sheet. V need not necessarily be contained, and therefore a lower limit of a content of V includes 0%. To sufficiently provide the advantageous effect of improving the strength brought by V, the content of V is preferably 0.010% or more, and more preferably 0.030% or more.

When the content of V is 0.200% or less, a decrease in the formabilities of the steel sheet due to an abundance of precipitation of its carbo-nitride can be prevented. The content of V is therefore set to 0.200% or less. The content of V may be 0 to 0.100% or may be 0.001 to 0.200%.

(Cr: 0% to 0.800%)

Cr (chromium) is an element that increases a hardenability of the steel, contributing to the improvement of the strength of the steel sheet. Cr need not necessarily be contained, and therefore a lower limit of a content of Cr includes 0%. To sufficiently provide the advantageous effect of improving the strength brought by Cr, the content of Cr is preferably 0.200% or more, and more preferably 0.300% or more.

When the content of Cr is 0.800% or less, the formation of coarse Cr carbide, which can serve as an origin of fracture, can be prevented. The content of Cr is therefore set to 0.800% or less. The content of Cr may be 0.001 to 0.700% or may be 0.001 to 0.800%.

(Ni: 0% to 0.250%)

Ni (nickel) is an element that prevents phase transformation at high temperatures, contributing to the improvement of the strength of the steel sheet. Ni need not necessarily be contained, and therefore a lower limit of a content of Ni includes 0%. To sufficiently provide the advantageous effect of improving the strength brought by Ni, the content of Ni is preferably 0.050% or more, and more preferably 0.200% or more. When the content of Ni is 0.250% or less, a decrease in weldability of the steel sheet can be prevented. The content of Ni is therefore set to 0.250% or less. The content of Ni may be 0.001 to 0.200%.

Preferable contents of O, Cu, W, Sn, Sb, Ca, Mg, Zr, and REM as optional additive elements will be described below. Note that none of these O, Cu, W, Sn, Sb, Ca, Mg, Zr, and REM contribute to the reduction of ghost lines when contained within the respective content ranges exemplified below. In other words, in the present embodiment, O, Cu, W, Sn, Sb, Ca, Mg, Zr, REM have no influence on the effect of providing a high strength and preventing the production of the surface unevenness after the forming as a result of reducing a fluctuation in Mn concentration due to microsegregation, which is brought by the application of the grain refining by direct rolling after solidification described later.

(O: 0% to 0.0100%)

O (oxygen) is an element that is mixed into in the production process for the steel sheet. A content of O may be 0%. By setting the content of O to 0.0001% or more, a refining time can be shortened, and in turn, the productivity can be increased. The content of O therefore may be 0.0001% or more, 0.0005% or more, or 0.0010% or more. On the other hand, when the content of O is 0.0100% or less, the formation of coarse oxides can be prevented, which can increase the formabilities of the steel sheet such as ductility, hole-expansion properties, stretch flangeability, and/or bendability. The content of O is therefore set to 0.0100% or less. The content of O may be 0.0070% or less, 0.0040% or less, or 0.0020% or less.

(Cu: 0% to 1.00%)

Cu (copper) is an element that is present in a form of fine particles in the steel, contributing to the improvement of the strength of the steel sheet. Although a content of Cu may be 0%, the content of Cu is preferably 0.001% or more to provide such an effect. The content of Cu may be 0.01% or more, 0.03% or more, or 0.05% or more. By setting the content of Cu to 1.00% or less, the weldability of the steel sheet can be made satisfactory. The content of Cu is therefore set to 1.00% or less. The Content of Cu may be 0.60% or less, 0.40% or less, or 0.20% or less.

(W: 0% to 1.00%)

W (tungsten) is an element that prevents phase transformation at high temperatures, contributing to the improvement of the strength of the steel sheet. Although a content of W may be 0%, the content of W is preferably 0.001% or more to provide such an effect. The content of W may be 0.01% or more, 0.02% or more, or 0.10% or more. By setting the content of W to 1.00% or less, a hot workability of the steel sheet can be increased, and in turn, the productivity can be increased. The content of W is therefore set to 1.00% or less. The content of W may be 0.80% or less, 0.50% or less, or 0.20% or less.

(Sn: 0% to 1.00%)

Sn (tin) is an element that prevents grains from coarsening, contributing to the improvement of the strength of the steel sheet. Although a content of Sn may be 0%, the content of Sn is preferably 0.001% or more to provide such an effect. The content of Sn may be 0.01% or more, 0.05% or more, or 0.08% or more. By setting the content of Sn to 1.00% or less, the embrittlement of the steel sheet can be prevented. The content of Sn is therefore set to 1.00% or less. The content of Sn may be 0.80% or less, 0.50% or less, or 0.20% or less.

(Sb: 0% to 0.200%)

Sb (antimony) is an element that prevents grains from coarsening, contributing to the improvement of the strength of the steel sheet. Although a content of Sb may be 0%, the content of Sb is preferably 0.001% or more to provide such an effect. The content of Sb may be 0.010% or more, 0.050% or more, or 0.080% or more. By setting the content of Sb to 0.200% or less, the embrittlement of the steel sheet can be prevented. The content of Sb is therefore set to 0.200% or less. The content of Sb may be 0.180% or less, 0.150% or less, or 0.120% or less.

(Ca: 0% to 0.0100%)
(Mg: 0% to 0.0100%)
(Zr: 0% to 0.0100%)
(REM: 0% to 0.0100%)

Ca (calcium), Mg (magnesium), Zr (zirconium), and REM (rare earth metal) are elements that contribute to the improvement of the formabilities of the steel sheet. Although contents of Ca, Mg, Zr, and REM may be 0%, the contents of Ca, Mg, Zr, and REM are each preferably 0.0001% or more or may be 0.0005% or more, 0.0010% or more, or 0.0015% or more to provide such an effect. By setting each of the contents of Ca, Mg, Zr, and REM to 0.0100% or less, the steel sheet can have a high ductility. The contents of Ca, Mg, Zr, and REM may each set to 0.0100% or less or may be 0.0080% or less, 0.0060% or less, or 0.0030% or less. REM is herein a generic term for 17 elements consisting of scandium (Sc) with atomic number 21, yttrium (Y) with atomic number 39, and lanthanoid, which includes lanthanum (La) with atomic number 57 through lutetium (Lu) with atomic number 71. The content of REM is a total content of these elements.

The balance of the chemical composition of the steel sheet according to the present embodiment may be Fe (iron) and impurities. Examples of the impurities include those that are mixed from raw materials of steel or scrap and/or in a steel-making process and elements that are allowed to be contained within ranges within which features of the steel sheet according to the present embodiment are not hampered. Examples of the impurities include H, Na, Cl, Co, Zn, Ga, Ge, As, Se, Tc, Ru, Rh, Pd, Ag, Cd, In, Te, Cs, Ta, Re, Os, Ir, Pt, Au, Pb, Bi, and Po. The impurities may be contained at 0.200% or less in total.

The chemical composition of the steel sheet is to be measured by a common analysis method. For example, the chemical composition is to be measured by the inductively coupled plasma-atomic emission spectrometry (ICP-AES). For the measurement of C and S, the infrared absorptiometry after combustion is to be used, and for the measurement of N, the inert gas fusion-thermal conductivity method is to be used. In a case where the steel sheet includes a plating layer on its surface, the plating layer on the surface is to be removed by mechanical grinding before the analysis of the chemical composition.

(Metal Micro-Structures Consisting of 70 to 95% of Ferrite in Volume Fraction and 5 to 30% of Hard Phases in Volume Fraction)

By setting a volume fraction of hard phases in the metal micro-structures of the steel sheet to 5% or more, the strength of the steel sheet can be improved sufficiently. Therefore, the volume fraction of the hard phases is set to 5% or more. By setting the volume fraction of the hard phases to 30% or less, the hard phases can be dispersed more evenly. Therefore, the surface unevenness produced in the forming can be reduced, and the appearance of the steel sheet after the forming can be improved.

The balance of the metal micro-structures, other than the hard phases, is ferrite, and a volume fraction of the ferrite is 70 to 95%. The total of the volume fractions of the ferrite and the hard phases in the metal micro-structures is 100%.

In the steel sheet according to the present embodiment, the hard phases are hard structures harder than ferrite and consist of any one or more of, for example, martensite, bainite, tempered martensite, and pearlite. From the point of improving the strength, the hard phases preferably consist of one or more of martensite, bainite, and tempered martensite, and more preferably consist of martensite.

The volume fraction of the hard phases in the metal micro-structure can be determined by the following method.

A sample for the observation of metal micro-structures (microstructures) (having a size that is roughly 20 mm in a rolling direction×20 mm in a width direction×thickness of the steel sheet) is extracted from a W/4 position or a 3W/4 position of a sheet width W of the resultant steel sheet (i.e., a W/4 position in the width direction from any one of edge portions of the steel sheet in the width direction). The sample is then subjected to the observation of metal micro-structures (microstructures) from a surface to a ½ sheet thickness of the sample under an optical microscope, and an area fraction of hard phase from a surface (in the case where the steel sheet is plated, the surface from which a plating layer is removed) to a ½ sheet thickness of the steel sheet is calculated. For preparing the sample, a sheet-thickness section in a direction perpendicular to the rolling is used as an observation surface, polished, and etched with LePera etchant.

From an optical microscope photograph or a scanning-electron microscope photograph with a magnification of ×500, "microstructures" are sorted out. In an observation under an optical microscope after LePera etching, structures are observed in different colors such as black for bainite, white for martensite (including tempered martensite), and gray for ferrite, and thus a distinction between ferrite and other hard structures can be made easily. In an optical microscope photograph, regions having colors other than gray, which indicate ferrite, are hard phases.

Ten visual fields in a region from a surface of the steel sheet etched with LePera etchant to a ½ sheet-thickness position from the surface in the sheet thickness direction are observed with a magnification of ×500 and are subjected to image analysis with image analysis software "Photoshop CS5" from Adobe Inc. to determine area fractions of the hard phases. As an technique of the image analysis, for example, a maximum luminance value $L_{max}$ and a minimum luminance value $L_{min}$ of each image are obtained from the image, portions including picture elements having luminances from $L_{max}-0.3(L_{max}-L_{min})$ to $L_{max}$ are defined as white regions, portions including picture elements having luminances from $L_{min}$ to $L_{min}+0.3(L_{max}-L_{min})$ are defined as black regions, other portions are defined as gray regions, and the area fractions of the hard phases, which are regions other than the gray regions, is calculated. The ten visual fields for the observation in total are subjected to the same image analysis as described above to measure the area fractions of the hard phases, and the area fractions are averaged to calculate an average value.

(Value X1 Obtained by Dividing Standard Deviation of Average Mn Concentrations in Rolling Direction at ¼ Sheet-Thickness Positions in Sheet Thickness Direction by Average Mn Concentration at ¼ Sheet-Thickness Positions Is 0.025 Or Less)

As stated above, Mn is an element that contributes to the improvement of the strength of the steel. The inventors of the present application found that when Mn heavily segregates, the hard phases are easily connected together into a band shape, and as a result, ghost lines tends to be produced when the steel sheet is subjected to press forming. The inventors of the present application then paid attention to the point that ghost lines are formed in a long, narrow band shape in a rolling direction of the steel sheet and paid attention to an average Mn concentration in the steel sheet in the rolling direction. The inventors of the present application further paid attention to a variation in Mn concentration in the sheet thickness direction in a region in which the attention was paid to the average Mn concentration in the steel sheet in the rolling direction. In particular, the attention was paid to the segregation of the Mn concentration in a region relatively close to a surface of the steel sheet. As a result, the inventors of the present application conceived that setting a value X1, which is obtained by dividing a standard deviation of average Mn concentrations in the rolling direction at ¼ sheet-thickness positions (in ¼ sheet-thickness regions) of the steel sheet in the sheet thickness direction by an average Mn concentration at the ¼ sheet-thickness positions, to 0.025 or less is effective in increasing surface qualities of a surface of the steel sheet and a surface of a formed item produced by performing the press forming on the steel sheet.

FIG. 1 is a schematic diagram for describing values X1 and X2 that are obtained by dividing standard deviations σ1 and σ2 of average Mn concentrations in a rolling direction L at ¼ sheet-thickness positions and a ½ sheet-thickness positions of the steel sheet in a sheet thickness direction T by the average Mn concentrations D13 and D23 at the corresponding ¼ sheet-thickness positions and the corresponding ½ sheet-thickness positions, respectively. In FIG. 1, a section 2 at the center of a steel sheet 1 in a width direction C is shown. The section 2 is a section parallel to the sheet thickness direction T and the rolling direction L of the steel sheet 1, that is, a section perpendicular to the width direction C of the steel sheet 1.

In the present embodiment, the observation at the "¼ sheet-thickness positions" refers to an observation in an observation area 11 that is 100 μm in the sheet thickness direction T×600 μm in the rolling direction L and centered a ¼ position from a front surface 3 of the steel sheet 1 in the sheet thickness direction T, and in an observation area 12 that is 100 μm in the sheet thickness direction T×600 μm in the rolling direction L and centered a ¼ position from a back surface 4 of the steel sheet 1 in the sheet thickness direction T, on the section 2 that is parallel to the sheet thickness direction T and the rolling direction L of the steel sheet 1 and at the center of the steel sheet 1 in the width direction C.

In the present embodiment, a configuration of the observation areas 11 and 12 being 200 μm in total in the sheet thickness direction T×600 μm in the rolling direction L for the observation at the ¼ sheet-thickness positions will be described, but the configuration is not necessarily as such. The observation areas 11 and 12 may be each less than 100 μm (e.g., 50 μm) or may take a value more than 100 μm (e.g., 150 μm) in the sheet thickness direction T. The observation areas 11 and 12 may be each less than 600 μm (e.g., 400 μm) or may take a value more than 600 μm (e.g., 800 μm) in the rolling direction L. In the present embodiment, a configuration on the section 2 at the center of the steel sheet 1 in the width direction C will be described, but the configuration is not necessarily as such. It will suffice that the same configuration as described for the configuration on the section 2 is provided on at least one of intermediate sections of the steel sheet 1 in the width direction C.

For the calculation of the value X1, first, spots on the section 2 where the observation areas 11 and 12 are to be set in the rolling direction L in the steel sheet 1 are subjected to mirror polish to prepare the section 2. The observation areas 11 and 12 are areas on the section 2.

Next, at predetermined depth positions in the observation areas 11 and 12 on the section 2, Mn concentrations D11 at 600 points are measured at measurement intervals of 1 μm in the rolling direction L. An apparatus used for the measurement is an electron probe micro analyzer (EPMA), and conditions for the measurement are that an acceleration voltage is set to 15 kV, and an irradiation time is set to 25 ms.

An average value of the resultant Mn concentrations D11 at 600 points $\{(\Sigma D11)/600\}$ is obtained as an average Mn concentration (mass %) at the predetermined depth position, that is, a rolling-direction average Mn concentration D12. The operation described above of measuring the Mn concentrations D11 at 600 points at the same depth position and calculating the rolling-direction average Mn concentration D12 at the depth position is performed every 1 μm in the sheet thickness direction T in the observation areas 11 and 12. This determines rolling-direction average Mn concentrations D12 at 200 points in the sheet thickness direction T in the observation areas 11 and 12.

Next, an average value D13 of all the rolling-direction average Mn concentrations D12 in the observation areas 11 and 12 is calculated. That is, an average value of the 200 rolling-direction average Mn concentrations D12 $\{(\Sigma D12)/200\}$ is calculated as an average Mn concentration in all the observation areas 11 and 12 (overall average Mn concentration D13).

Next, the rolling-direction average Mn concentration D12 at every 1 μm depth position in the sheet thickness direction T is used as a sample to calculate the standard deviation σ1 in the sheet thickness direction T. That is, the standard deviation of rolling-direction average Mn concentrations D12 at each depth position is calculated. Note that $\sigma1^2 = (1/200)\Sigma(D12-D13)^2$.

Next, the standard deviation σ1 divided by the overall average Mn concentration D13 at the ¼ sheet-thickness positions gives the value X1. When the Mn concentrations D11 are measured, Mn concentrations may be measured at intervals of 1 μm in the sheet thickness direction T and at intervals of 1 μm in the rolling direction L in the entire portion of the section 2 of the steel sheet 1 where the observation areas 11 and 12 are provided in the rolling direction L and that includes spots other than the observation areas 11 and 12. In this case, Mn concentrations necessary for the measurement in the observation areas 11 and 12 out of the measured Mn concentrations are used as the Mn concentrations D11.

As to how to prevent ghost lines from being produced in a press-formed item, the inventors of the present application found that the production of ghost lines can be prevented by reducing the segregation of Mn concentration in the vicinity of a surface of the steel sheet to be a starting material, specifically, by setting the value X1 to 0.025 or less. The value X1 is therefore set to 0.025 or less in the present embodiment. The value X1 is preferably 0.020 or less. Note that a lower limit of the value X1 is 0.

(Value X2 Obtained by Dividing Standard Deviation of Average Mn Concentrations in Rolling Direction at ½ Sheet-Thickness Positions in Sheet Thickness Direction by Average Mn Concentration at ½ Sheet-Thickness Positions Is 0.035 Or Less)

As stated above, when the value X1 is 0.025 or less, the production of ghost lines by performing the press forming on the steel sheet can be prevented. The inventors of the present application further paid attention to the segregation of Mn concentration in a deep region from the front surface 3 of the steel sheet 1. As a result, the inventors of the present application conceived that setting a value X2, which is obtained by dividing the standard deviation σ2 of average Mn concentrations in the rolling direction L at a ½ sheet-thickness positions (in a ½ sheet-thickness region) of the steel sheet 1 in the sheet thickness direction T by an average Mn concentration D23 at the ½ sheet-thickness positions, to 0.035 or less is effective in further increasing the surface qualities of a surface of the steel sheet 1 and a surface of the formed item produced by performing the press forming on the steel sheet 1.

The observation at the "½ sheet-thickness positions" on the section 2 illustrated in FIG. 1 refers to an observation in an observation area 13 that is centered a ½ position from the front surface 3 of the steel sheet 1 in the sheet thickness direction T. The observation area 13 is the same as the observation areas 11 and 12 except that a position of the observation area 13 is different from those of the observation areas 11 and 12 in the sheet thickness direction T.

For the calculation of the value X2, first, at a predetermined depth position in the observation area 13 on the section 2, Mn concentrations at 600 points (Mn concentrations D21 at 600 points) are measured at measurement intervals of 1 μm in the rolling direction L. A method for measuring the Mn concentrations D21 is the same as the method for measuring the block Mn concentrations D11.

An average value of the resultant Mn concentrations D21 at 600 points {(ΣD21)/600} is obtained as an average Mn concentration (mass %) at the predetermined depth position, that is, a rolling-direction average Mn concentration D22. The operation described above of measuring the Mn concentrations D21 at 600 points at the same depth position and calculating the rolling-direction average Mn concentration D22 at the depth position is performed every 1 μm in the sheet thickness direction T in the observation area 13. This determines rolling-direction average Mn concentrations D22 at 100 points in the sheet thickness direction T in the observation area 13.

Next, an average value D23 of all the rolling-direction average Mn concentrations D22 in the observation area 13 is calculated. That is, an average value of the 100 rolling-direction average Mn concentrations D22 {(ΣD22)/100} is calculated as an average Mn concentration in the entire observation area 13 (overall average Mn concentration D23).

Next, the rolling-direction average Mn concentration D22 at every 1 μm depth position in the sheet thickness direction T is used as a sample to calculate the standard deviation σ2 in the sheet thickness direction T. That is, the standard deviation σ2 of rolling-direction average Mn concentrations D22 at each depth position is calculated. Note that $\sigma 2^2=(1/100)\Sigma(D22-D23)^2$.

Next, the standard deviation σ2 divided by the overall average Mn concentration D23 at the ½ sheet-thickness positions gives the value X2. When the Mn concentrations D21 are measured, Mn concentrations may be measured at intervals of 1 μm in the sheet thickness direction T and at intervals of 1 μm in the rolling direction L in the entire portion of the section 2 of the steel sheet 1 where the observation area 13 is provided in the rolling direction L and that includes spots other than the observation area 13. In this case, Mn concentrations necessary for the measurement in the observation area 13 of the measured Mn concentrations are used as the Mn concentrations D13.

As to how to prevent ghost lines from being produced in a press-formed item more reliably, the inventors of the present application found that the production of ghost lines can be prevented by reducing the segregation of Mn concentration at the center of the steel sheet to be a starting material, specifically, by setting the value X2 to 0.035 or less. The value X2 is therefore set to 0.035 or less in the present embodiment. The value X2 is preferably 0.030 or less. Note that a lower limit of the value X2 is 0.

(Area of Hard Phases Connected Together by 100 μm Or More in Rolling Direction Is 30% Or Less of Area of All Hard Phases in Region between ¼ Sheet-Thickness Positions And ½ Sheet-Thickness Position)

When the area of hard phases connected together by 100 μm or more in the rolling direction is 30% or less of the area of all hard phases, convex deformation of hard phases in performing the press forming on the steel sheet and concave deformation of soft phases around the hard phases are prevented from running long in the rolling direction, which can prevent the production of ghost lines easy to visually recognize. It is therefore preferable in the present embodiment that the area of hard phases connected together by 100 μm or more in the rolling direction is 30% or less of the area of all hard phases in the region between the ¼ sheet-thickness positions and the ½ sheet-thickness position. The proportion is more preferably 20% or less. A lower limit of the proportion is 0%.

A method for measuring the proportion in the present embodiment is as follows. First, on a section of the steel sheet that is parallel to the sheet thickness direction and the rolling direction and is at the center of the steel sheet in the width direction, an observation area that is in a region between the ¼ sheet-thickness positions and the ½ sheet-thickness position from a surface of the steel sheet in the sheet thickness direction and is 400 μm in the rolling direction (a connected hard phase observation area) is specified. Note that the length of the connected hard phase observation area in the rolling direction may be less than 400 μm (e.g., 300 μm) or may take a value more than 400 μm (e.g., 500 μm). Note that a lower limit of the length of the connected hard phase observation area in the rolling direction is set to 250 μm.

Next, in the connected hard phase observation area, an area AR1 of the hard phases that are connected together by 100 μm or more in the rolling direction is measured. Specifically, in the connected hard phase observation area, the hard phases connected together by 100 μm or more in the rolling direction are extracted by the image processing according to the method for measuring the hard phases. In this case, the word "connected" indicates that crystal grain boundaries of the hard phases are adjacent to one another. Next, in the connected hard phase observation area, an area AR2 of all hard phases is measured according to the method for measuring the hard phases. Then, AR1/AR2 is calculated.

(Average Grain Diameter of Ferrite: 5.0 to 30 Um)

When an average grain diameter of the ferrite is 30 μm or less, a decrease in the appearance after the forming can be prevented. It is therefore preferable to set the average grain diameter of the ferrite to 30 μm or less. The average grain diameter is more preferably set to 15 μm or less.

On the other hand, when the average grain diameter of the ferrite is 5.0 μm or more, particles of the ferrite having the {001} orientation can be prevented from becoming likely to be produced in the form of their agglomerates. Even if individual particles having the {001} orientation of the ferrite are small, when these particles are produced in the form of their agglomerates, deformation is concentrated on a portion of the agglomeration. By preventing these particles from agglomerating, a decrease in the appearance after the forming can be prevented. For that reason, it is preferable to set a preferable average grain diameter of the ferrite to 5.0 μm or more. The average grain diameter is more preferably 8.0 μm or more, still more preferably 10.0 μm or more, and even still more preferably 15.0 μm.

The average grain diameter of the ferrite in the steel sheet can be determined by the following method. Specifically, ten visual fields in a region from a surface of the steel sheet etched with LePera etchant to a ½ sheet-thickness position in the sheet thickness direction are observed with a magnification of ×500 and are subjected to image analysis with image analysis software "Photoshop CS5" from Adobe Inc. in the same manner as described above to calculate area fractions occupied by the ferrite and the numbers of particles of the ferrite. The area fractions are totalized, the numbers of particles are totalized, and the totalized area fraction occupied by the ferrite is divided by the totalized number of particles of the ferrite to calculate an average area fraction per ferrite particle. From the average area fraction and the number of particles, an equivalent circle diameter is calculated, and the resultant equivalent circle diameter is taken as the average grain diameter of the ferrite.

(Average Grain Diameter of Hard Phases is 1.0 to 5.0 Um)

When an average grain diameter of the hard phases is 5.0 μm or less, a decrease in the appearance after the forming can be prevented. It is therefore preferable to set a preferable average grain diameter of the hard phases in the steel sheet to 5.0 μm or less. The average grain diameter is more preferably set to 4.5 μm or less, and further preferably set to 4.0 μm or less.

On the other hand, when the average grain diameter of the hard phases is 1.0 μm or more, particles of the hard phases can be prevented from becoming likely to be produced in the form of their agglomerates. By making individual particles of the hard phases small and preventing these particles from agglomerating, a decrease in the appearance after the forming can be prevented. It is therefore preferable to set a preferable average grain diameter of the hard phases in the steel sheet to 1.0 μm or more. The average grain diameter is more preferably 1.5 μm or more, and further preferably 2.0 μm or more.

The average grain diameter of the hard phases can be determined by the following method. Specifically, ten visual fields in a region from a surface of the steel sheet etched with LePera etchant to a ½ sheet-thickness position in the sheet thickness direction are observed with a magnification of ×500 and are subjected to image analysis with image analysis software "Photoshop CS5" from Adobe Inc. in the same manner as described above to calculate area fractions occupied by the hard phases and the numbers of particles of the hard phases. The area fractions are totalized, the numbers of particles are totalized, and the totalized area fraction occupied by the hard phases is divided by the totalized number of particles of the hard phases to calculate an average area fraction per particle of hard phase. From the average area fraction and the number of particles, an equivalent circle diameter is calculated, and the resultant equivalent circle diameter is taken as the average grain diameter of the hard phases.

(Value Z1 Obtained by Dividing Difference between Maximum And Minimum of Average Mn Concentrations in Rolling Direction at ¼ Sheet-Thickness Positions in Sheet Thickness Direction by Average Mn Concentration at ¼ Sheet-Thickness Positions Is 0.110 Or Less)

As stated above, when the value X1 is 0.025 or less, the production of ghost lines by performing the press forming on the steel sheet can be prevented. The inventors of the present application further paid attention to the degree of the segregation of Mn concentration at the ¼ sheet-thickness positions in the steel sheet. As a result, with reference to FIG. 1, the inventors of the present application conceived that setting a value Z1, which is obtained by dividing a difference between the maximum and the minimum of the average Mn concentrations (rolling-direction average Mn concentrations D12) in the rolling direction L at the ¼ sheet-thickness positions (in the observation areas 11 and 12) in the sheet thickness direction T by an average Mn concentration (overall average Mn concentration D13) at the ¼ sheet-thickness positions, to 0.110 or less is effective in further increasing the surface qualities of a surface of the steel sheet and a surface of the formed item produced by performing the press forming on the steel sheet. The value Z1 is more preferably 0.080 or less.

More specifically, referring to FIG. 1, at the ¼ sheet-thickness positions, that is, in the observation areas 11 and 12, rolling-direction average Mn concentrations (rolling-direction average Mn concentrations D12) at each depth position are calculated by the method described above. Next, a difference Δ1 between a maximum value and a minimum value of the rolling-direction average Mn concentrations D12 at the depth positions in the sheet thickness direction T is calculated. Next, the value Z1, which is the difference Δ1 divided by the overall average Mn concentration D13 at the ¼ sheet-thickness positions, that is, in all the observation areas 11 and 12 (=Δ1/D13), is calculated.

(Value Z2 Obtained by Dividing Difference between Maximum And Minimum of Average Mn Concentrations in Rolling Direction at ½ Sheet-Thickness Positions in Sheet Thickness Direction by Average Mn Concentration at ½ Sheet-Thickness Positions Is 0.150 Or Less)

As stated above, when the value X2 is 0.035 or less, the production of ghost lines by performing the press forming on the steel sheet can be prevented. The inventors of the present application further paid attention to the degree of the segregation of Mn concentration in the vicinity of the center of the steel sheet. As a result, referring to FIG. 1, the inventors of the present application conceived that setting a value Z2, which is obtained by dividing a difference between the maximum and the minimum of the average Mn concentrations (rolling-direction average Mn concentrations D22) in the rolling direction L at the ½ sheet-thickness positions in the sheet thickness direction by an average Mn concentration (overall average Mn concentration D23) at the ½ sheet-thickness positions, to 0.150 or less is effective in further increasing the surface qualities of a surface of the steel sheet and a surface of the formed item produced by performing the press forming on the steel sheet. The value Z2 is more preferably 0.120 or less.

More specifically, referring to FIG. 1, at the ½ sheet-thickness positions, that is, in the observation area 13, average Mn concentrations (rolling-direction average Mn concentrations D22) at each depth position are calculated by the method described above. Next, a difference Δ2 between a maximum value and a minimum value of the rolling-direction average Mn concentrations D22 at the depth positions in the sheet thickness direction T is calculated. Next, the value Z2, which is the difference Δ2 divided by the overall average Mn concentration D23 at the ½ sheet-thickness positions, that is, in the entire observation area 13 (=Δ2/D23), is calculated.

The steel sheet according to the present embodiment may include a plating layer on at least one of its surfaces of the steel sheet. Examples of the plating layer include a galvanized layer and a galvanized alloy layer as well as a galvannealed layer and a galvannealed alloy layer, which are respectively a galvanized layer and a galvanized alloy layer subjected to alloying treatment.

The galvanized layer and the galvanized alloy layer are formed by a hot-dip galvanizing method, an electroplating method, or a vapor deposition plating method. When a content of Al in the galvanized layer is 0.5 mass % or less, the galvanized layer can have a sufficient adhesiveness between the surface of the steel sheet and the galvanized layer. It is therefore preferable that the content of Al in the galvanized layer is 0.5 mass % or less.

In the case where the galvanized layer is a hot-dip galvanized layer, a content of Fe in the hot-dip galvanized layer is preferably 3.0 mass % or less to increase the adhesiveness between the surface of the steel sheet and the galvanized layer. In the case where the galvanized layer is an electrogalvanized layer, a content of Fe in the electrogalvanized layer is preferably 0.5 mass % or less from the point of improving corrosion resistance.

The galvanized layer and the galvanized alloy layer may contain one, or two or more elements of Al, Ag, B, Be, Bi, Ca, Cd, Co, Cr, Cs, Cu, Ge, Hf, Zr, I, K, La, Li, Mg, Mn, Mo, Na, Nb, Ni, Pb, Rb, Sb, Si, Sn, Sr, Ta, Ti, V, W, Zr, and REM within their respective range within which the elements do not hamper a corrosion resistance and a formability of the steel sheet. In particular, Ni, Al, and Mg are effective in improving the corrosion resistance of the steel sheet.

The galvanized layer or the galvanized alloy layer may be respectively a galvannealed layer or a galvannealed alloy layer that is the galvanized layer or the galvanized alloy layer subjected to alloying treatment. When the alloying treatment is performed on a hot-dip galvanized layer or a hot-dip galvanized alloy layer, it is preferable to set a content of Fe in the hot-dip galvanized layer or the hot-dip galvanized alloy layer subjected to the alloying treatment (a galvannealed layer or a galvannealed alloy layer) to 7.0 to 13.0 mass % from the viewpoint of improving the adhesiveness between the surface of the steel sheet and the alloyed plating layer. By performing the alloying treatment on the steel sheet including the hot-dip galvanized layer or the hot-dip galvanized alloy layer, Fe is incorporated in the plating layer, thus increasing the content of Fe. This can increase the content of Fe to 7.0 mass % or more. That is, a galvanized layer having a content of Fe of 7.0 mass % or more is a galvannealed layer or a galvannealed alloy layer.

The content of Fe in the plating layer can be obtained by the following method. Only the plating layer is dissolved and removed with a 5 vol % aqueous solution of HCl with an inhibitor added. A content of Fe in the resultant solution is measured by the inductively coupled plasma-atomic emission spectrometry (ICP-AES), and a content of Fe (mass %) in the plating layer is obtained.

(Sheet Thickness of Steel Sheet is 0.20 mm to 1.00 mm)

The sheet thickness of the steel sheet according to the present embodiment is not limited to a particular range but is preferably 0.20 to 1.00 mm with consideration given to a versatility and a producibility of the steel sheet. Setting the sheet thickness to 0.20 mm or more makes it easy to maintain the shape of the steel sheet flat, enabling the improvement in dimensional accuracy and form accuracy. Therefore, the sheet thickness is preferably 0.20 mm or more, preferably 0.35 mm or more, and more preferably 0.40 mm or more.

If the sheet thickness is more than 1.00 mm, the effect of weight reduction of a member is reduced. Therefore, the sheet thickness is preferably 1.00 mm or less, preferably 0.70 mm or less, and more preferably 0.60 mm or less. The sheet thickness of the steel sheet can be measured with a micrometer.

Next, a press-formed item produced by performing the press forming on the steel sheet described above will be described. The press-formed item has the same chemical composition as the steel sheet. The press-formed item may include the plating layer described above on at least one of surfaces of the press-formed item. Since the press-formed item is obtained by performing the press forming on the steel sheet, the production of ghost lines are prevented, and thus the press-formed item is excellent in appearance quality.

(Steel Sheet to be Used as Automobile Skin Panel)

Concrete examples of the press-formed item formed by performing the press forming on the steel sheet include an automobile skin panel. An automobile skin panel directly comes to consumer's notice as the external view of an automobile. For that reason, forming an automobile skin panel with a steel sheet on which ghost lines are prevented and that is excellent in appearance quality provides an automobile having a high marketability due to its excellence in appearance. Concrete examples of the automobile skin panel include panel components such as a door outer panel of an automobile body. Examples of the panel components include a hood outer panel, a quarter panel such as a fender panel, a door outer panel, and a roof panel.

<Production Method>

Next, a preferable method for producing the steel sheet according to the present embodiment will be described. Irrespective of its production method, the steel sheet according to the present embodiment provides its effect as long as the steel sheet has properties described above. However, the following method is preferable because it allows a stable production of the steel sheet.

Specifically, the steel sheet according to the present embodiment can be produced by a production method including the following steps (i) to (v):

(i) Slab forming step of solidifying a molten steel having the chemical composition described above to form a slab, (ii) Grain refining by direct rolling after solidification step of rolling the slab immediately after solidified with a rolling reduction of 30 to 50% while a temperature of the center portion of the slab is 1100 to 1400° C. to form a cast piece, (iii) Hot rolling step of heating the cast piece to 1100° C. or more, subjecting the cast piece to hot rolling such that a rolling finish temperature is 950° C. or less to provide a hot-rolled steel sheet, and then coiling the hot-rolled steel sheet at 450 to 650° C., (iv) Cold rolling step of uncoiling the coiled hot-rolled steel sheet and subjecting the hot-rolled steel sheet to cold rolling with an RCR, accumulative rolling ratio, being 50 to 90% to provide a cold-rolled steel sheet, and (v) Step of annealing the cold-rolled steel sheet and then forming the plating layer described above as necessary.

Each of the steps will be described below.

[Slab Forming Step]

In the slab forming step, a molten steel having a predetermined chemical composition is formed into a slab. Any manufacturing process may be used for the slab forming step. For example, a slab produced by performing a continuous casting process on a molten steel having the chemical composition melted with a converter furnace, an electric furnace, or the like may be used. In place of the continuous casting process, an ingot-making process, a thin slab casting process, or the like may be adopted.

[Grain Refining by Direct Rolling after Solidification Step]

In the grain refining by direct rolling after solidification step, the slab formed by the continuous casting or the like and immediately after solidified is rolled, thus performing the rolling while the temperature of the slab as being formed is maintained. Until the grain refining by direct rolling after solidification step, it is preferable not to reheat the slab, and the state where the temperature of the center of the slab does not fall below 1100° C. is maintained. By performing the grain refining by direct rolling on the slab immediately after solidified, a great strain can be added to the vicinities of surfaces of the slab and the vicinity of the thickness center of the slab, thus a great hydrostatic stress can be added. The temperature of a center portion of the slab is set to 1100° C. to 1400° C. When the temperature of the center portion of the slab is 1100° C. or more, the effect of reducing Mn segregation in the slab can be heightened, and a load imposed on a rolling facility can be reduced. Further, when the temperature of the center portion of the slab is 1400° C. or less, the temperature of the center portion of the slab does not exceed a solidus temperature, and an inner crack due to the rolling can be prevented. The temperature of the center portion of the slab is preferably 1100° C. or more to less than 1300° C. The rolling reduction of the slab is set to 30 to 50%. When the rolling reduction of the slab is 30% or more, the Mn segregation can be reduced sufficiently. There is no specific limit on an upper limit of the rolling reduction of the slab, but the rolling reduction is preferably 50% or less in the point of production efficiency. The number of passes of the rolling is preferably one, three at most, in the point that one heavy rolling performed on the slab reliably exerts the effect of reducing the Mn segregation.

Note that the effect of preventing the Mn segregation provided by the grain refining by direct rolling after solidification step cannot be provided by a rough rolling step. In the rough rolling step, a rolling reduction in each pass is set to be small, its rolling is performed in a plurality of passes, and the temperature in the rolling is low. As a result, the rough rolling step fails to provide the effect of reducing the Mn segregation as provided by the grain refining by direct rolling after solidification, and thus it cannot be said that the rough rolling step is capable of building micro-structures for reducing ghost lines.

[Hot Rolling Step]

The slab subjected to the grain refining by direct rolling after solidification is heated to 1100° C. or more before the hot rolling. The heating temperature set to 1100° C. or more causes a rolling reaction force not to increase excessively in the subsequent hot rolling, helping to yield a product thickness as targeted. In addition, the heating temperature set to 1100° C. or more enables the precision of the sheet shape to be increased, enabling a smooth coiling.

There is no need to limit an upper limit of a heating temperature of the cast piece, but the heating temperature is preferably set to less than 1300° C. from the economical viewpoint.

In the hot rolling step, the cast piece heated to the heating temperature is subjected to the hot rolling.

A rolling finish temperature of the hot rolling is set to 950° C. or less. By setting the rolling finish temperature to 950° C. or less, an average grain diameter of the hot-rolled steel sheet does not increase excessively. In this case, an average grain diameter of a final product sheet can be made small, which enables the final product sheet to have a sufficient yield strength and to have high surface quality after forming.

A coiling temperature in the hot rolling step is preferably set to 450 to 650° C. By setting the coiling temperature to 650° C. or less, grain diameters can be made fine, which enables the steel sheet to have a sufficient strength. Further, thicknesses of scales can be reduced, which enables the steel sheet to have sufficient pickling properties. In addition, by setting the coiling temperature to 450° C. or more, a strength of the hot-rolled steel sheet does not increase excessively, which reduces a load to a facility that performs the cold rolling step, thus further increasing the productivity.

[Cold Rolling Step]

In the cold rolling step, the cold rolling with an RCR, accumulative rolling ratio, being 50 to 90% to provide a cold-rolled steel sheet. By subjecting the hot-rolled steel sheet with the predetermined residual stress added to the cold rolling with the accumulative rolling ratio, ferrite including desired texture is provided after annealing and cooling.

When the accumulative rolling ratio RCR is 50% or more, a sheet thickness of the cast piece that is calculated backward from the sheet thickness of the steel sheet can be kept sufficiently for the hot rolling step, and thus performing the hot rolling step is practical. When the accumulative rolling ratio RCR is 90% or less, a rolling load does not increase excessively, and a sufficient uniformity of material quality of the steel sheet in a sheet width direction can be kept. Further, a sufficient stability of the production can be kept. Therefore, the accumulative rolling ratio RCR in the cold rolling is set to 50 to 90%.

[Annealing Step]

In the annealing step, annealing in which the cold-rolled steel sheet is heated to and held at a holding temperature of 750 to 900° C. is performed. When the holding temperature is 750° C. or more, the recrystallization of ferrite and the reverse transformation from ferrite to austenite proceed sufficiently, and thus a desired texture can be provided. When the hold temperature is 900° C. or less, grains are densified, providing a sufficient strength. Further, the heating temperature is not excessively high, enabling the productivity to be increased.

[Cooling Step]

In the cooling step, the cold-rolled steel sheet that has been held in the annealing step is cooled. The cooling is performed in such a manner that an average cooling rate of the cooling from the holding temperature is 5.0 to 50° C./sec. When the average cooling rate is 5.0° C./see or more, ferrite transformation is not promoted excessively, which increases an amount of produced hard phases such as martensite, providing a desired strength. When the average cooling rate is 50° C./see or less, the steel sheet can be cooled more evenly in the width direction of the steel sheet.

[Plating Step]

The cold-rolled steel sheet provided by the method may be further subjected to a plating step of forming plating layers on the surfaces of the cold-rolled steel sheet.

[Alloying Step]

The plating layers formed in the plating step may be alloyed. An alloying temperature of an alloying step is, for example, 450 to 600° C.

By the production method, the application of the grain refining by direct rolling after solidification makes a variation in Mn concentration attributable to microsegregation small and thus can provide the steel sheet according to the present embodiment, which has high strength and has excellent appearance quality because the production of surface unevenness after the forming can be prevented.

EXAMPLES

Next, Examples of the present invention will be described. Note that conditions described in Examples are merely an example of conditions that was adopted for confirming feasibility and effects of the present invention, and the present invention is not limited to this example of conditions. In the present invention, various conditions can be adopted as long as the conditions allow the objective of the present invention to be achieved without departing from the gist of the present invention.

Steels having chemical compositions shown as Cast piece Nos. A to K shown in Table 1 were melted and subjected to continuous casting to be produced into slabs each having a thickness of 200 to 300 mm. Immediately after the slabs were formed, some of the resultant slabs were subjected to one pass of the grain refining by direct rolling after solidification in which some of the resultant slabs were rolled at slab center portion temperatures and rolling reductions shown in Table 2 while the center portions of the slabs were maintained at temperatures not below 1100° C. Note that Steel sheet Nos. A3, B2, C2, and D2 shown in Table 2 were not subjected to the grain refining by direct rolling after solidification.

Next, the cast pieces subjected to the grain refining by direct rolling after solidification and the cast pieces not subjected to the grain refining by direct rolling after solidification were subjected to the hot rolling under conditions shown in Table 2 and coiled.

The coils were then uncoiled and subjected to the cold rolling with accumulative rolling ratios RCR shown in Table 2, by which steel sheets A1 to K1 were provided.

The steel sheets were then annealed and cooled under conditions shown in Table 3. In addition, some of the steel sheets were plated to have plating layers formed on their surfaces. In Table 4, CR indicates not plating, GI indicates hot dip galvanized, and GA indicates hot dip galvanized alloy.

The resultant product sheet Nos. A1a to K1a were subjected to the measurement of sheet thickness with a micrometer.

The product sheet Nos. A1a to K1a were subjected to the measurement of tensile strength. The tensile strength was evaluated in conformance with JIS Z 2241:2011. Test specimens used were No. 5 test coupons specified in JIS Z 2241:2011. Extract position of a tensile test specimen was set as a ¼ portion from an edge portion in the sheet width direction, and a longitudinal direction of the tensile test specimen was set as a direction perpendicular to the rolling direction. When a tensile test specimen gave a tensile strength that was 500 MPa or more, the tensile test specimen was determined to have a high strength and rated as good. When the tensile test specimen gave a tensile strength that was less than 500 MPa, the tensile test specimen was determined to be poor in strength and rated as failed.

In addition, volume fractions of the hard phases in metal micro-structures of the resultant product sheet Nos. A1a to K1a were measured by the method described above. In each of the metal micro-structures of the product sheet Nos. A1a to K1a, the total of volume fractions of the hard phases and the ferrite was 100%.

In addition, average grain diameters of ferrite and average grain diameters of the hard phases in the metal micro-structures of the resultant product sheet Nos. A1a to K1a were measured by the method described above.

The results are shown in Table 4.

TABLE 1

| Cast piece No. | Chemical Composition (mass %) | | | | | | | | | | | | | | | |
|---|---|---|---|---|---|---|---|---|---|---|---|---|---|---|---|---|
| | C | Si | Mn | P | S | Al | N | B | Mo | Ti | Nb | V | Cr | Ni | O | Other elements |
| A | 0.080 | 0.450 | 2.04 | 0.016 | 0.003 | 0.042 | 0.0035 | | | | | | 0.410 | | 0.0009 | |
| B | 0.110 | 0.020 | 1.28 | 0.015 | 0.001 | 0.310 | 0.0028 | | 0.100 | | | | | | 0.0013 | |
| C | 0.060 | 0.050 | 2.07 | 0.021 | 0.002 | 0.350 | 0.0027 | 0.0015 | 0.080 | 0.011 | | 0.022 | 0.380 | | 0.0010 | |
| D | 0.100 | 0.010 | 1.34 | 0.020 | 0.001 | 0.290 | 0.0039 | 0.0016 | 0.110 | | 0.010 | | | 0.050 | 0.0016 | |
| E | <u>0.163</u> | 0.150 | 1.51 | 0.017 | 0.004 | 0.062 | 0.0048 | | 0.092 | | | | 0.151 | | 0.0019 | |
| F | <u>0.030</u> | 0.230 | 1.81 | 0.017 | 0.004 | 0.062 | 0.0048 | | | 0.024 | | | 0.320 | | 0.0012 | |
| G | 0.060 | 0.030 | <u>2.67</u> | 0.015 | 0.002 | 0.038 | 0.0038 | | | 0.013 | 0.013 | | | | 0.0013 | |
| H | 0.078 | 0.412 | <u>1.99</u> | 0.013 | 0.022 | 0.025 | 0.0026 | | | | | | | | 0.0011 | Cu: 0.05, W: 0.04 |
| I | 0.075 | 0.315 | 1.97 | 0.018 | 0.002 | 0.031 | 0.0036 | | | | | | | | 0.0009 | Sn: 0.08, Sb: 0.010 |
| J | 0.058 | 0.021 | 1.69 | 0.032 | 0.002 | 0.298 | 0.0026 | 0.0013 | | 0.015 | | | 0.359 | | 0.0016 | Mg: 0.0031, ZR: 0.0052 |
| K | 0.057 | 0.021 | 1.73 | 0.032 | 0.002 | 0.302 | 0.0036 | 0.0015 | | 0.010 | | | 0.402 | | 0.0010 | Ca: 0.0018, REM: 0.0016 |

The underline indicates that the underlined value fell out of its range according to the present invention.

TABLE 2

| Cast piece No. | Steel sheet No. | Grain refining by direct rolling after solidification | | Hot rolling | | | Cold rolling |
|---|---|---|---|---|---|---|---|
| | | Slab center portion temperature (° C.) | Rolling reduction (%) | Heating temperature (° C.) | Rolling finish temperature (° C.) | Coiling temperature (° C.) | Rolling reduction RCR (%) |
| A | A1 | 1280 | 50 | 1200 | 900 | 570 | 83 |
| A | A2 | 1150 | 30 | 1200 | 900 | 570 | 83 |
| A | A3 | — | — | 1200 | 900 | 570 | 83 |
| B | B1 | 1230 | 35 | 1230 | 880 | 600 | 84 |
| B | B2 | — | — | 1230 | 880 | 600 | 84 |
| C | C1 | 1260 | 45 | 1250 | 920 | 620 | 80 |
| C | C2 | — | — | 1250 | 920 | 620 | 80 |
| C | C3 | 1270 | 45 | 1220 | 910 | 580 | 84 |
| C | C4 | 1250 | 40 | 1220 | 910 | 520 | 73 |
| D | D1 | 1250 | 40 | 1250 | 900 | 540 | 78 |
| D | D2 | — | — | 1250 | 900 | 540 | 78 |
| E | E1 | 1250 | 40 | 1180 | 910 | 580 | 83 |
| F | F1 | 1220 | 35 | 1230 | 900 | 550 | 85 |
| G | G1 | 1250 | 40 | 1250 | 890 | 600 | 82 |
| H | H1 | 1250 | 45 | 1230 | 900 | 550 | 80 |
| I | I1 | 1260 | 38 | 1230 | 900 | 550 | 83 |

TABLE 2-continued

| | | Grain refining by direct rolling after solidification | | Hot rolling | | | Cold rolling |
|---|---|---|---|---|---|---|---|
| Cast piece No. | Steel sheet No. | Slab center portion temperature (° C.) | Rolling reduction (%) | Heating temperature (° C.) | Rolling finish temperature (° C.) | Coiling temperature (° C.) | Rolling reduction RCR (%) |
| J | J1 | 1240 | 45 | 1250 | 910 | 580 | 78 |
| K | K1 | 1270 | 40 | 1250 | 910 | 580 | 80 |

TABLE 3

| | | Annealing | | |
|---|---|---|---|---|
| Cast piece No. | Steel sheet No. | Heating temperature (° C.) | Cooling rate after heating (° C./sec) | Alloying temperature (° C.) |
| A | A1 | 800 | 8 | 550 |
| A | A2 | 800 | 8 | 550 |
| A | A3 | 800 | 8 | 550 |
| B | B1 | 820 | 6 | 530 |
| B | B2 | 820 | 6 | 530 |
| C | C1 | 830 | 10 | — |
| C | C2 | 830 | 10 | — |
| C | C3 | 780 | 12 | 580 |
| C | C4 | 790 | 10 | 560 |
| D | D1 | 800 | 8 | 550 |
| D | D2 | 800 | 8 | 550 |
| E | E1 | 790 | 10 | — |
| F | F1 | 810 | 7 | 500 |
| G | G1 | 850 | 8 | 540 |
| H | H1 | 780 | 10 | 580 |
| I | I1 | 790 | 10 | 560 |
| J | J1 | 810 | 12 | 550 |
| K | K1 | 810 | 12 | 560 | average Mn concentration D13 in the observation areas 11 and 12 were calculated. Using the results of the measurement result, the overall average Mn concentration D13, the value X1 (standard deviation σ1/overall average Mn concentration D13), the maximum value and the minimum value of the rolling-direction average Mn concentrations D12, and the value Z1 {(maximum value-minimum value of rolling-direction average Mn concentrations D12)/overall average Mn concentration D13} were calculated.

For each of the resultant product sheet Nos. A1a to K1a, in the observation area 13 at the ½ sheet-thickness position, Mn concentrations at 600 points (Mn concentrations D21 at 600 points) were measured by the method described above at measurement intervals of 1 μm in the rolling direction L at every 1 μm depth position in the sheet thickness direction T. Then, the rolling-direction average Mn concentration D22 at each depth position, and the overall average Mn concentration D23 in the observation area 13 were calculated. Using the measurement result, the overall average Mn concentration D23, the value X2 (standard deviation σ2/overall average Mn concentration D23), the maximum value and the minimum value of the rolling-direction aver-

TABLE 4

| Steel sheet No. | Product sheet No. | Sheet thickness (mm) | Plating type | Tensile strength (MPa) | Ferrite volume fraction (%) | Hard phase volume fraction (%) | Ferrite average grain diameter (μm) | Hard phase average grain diameter (μm) | Remarks |
|---|---|---|---|---|---|---|---|---|---|
| A1 | A1a | 0.40 | GA | 650 | 85 | 15 | 12.3 | 3.6 | Inventive example |
| A2 | A2a | 0.40 | GA | 655 | 85 | 15 | 13.0 | 3.2 | Inventive example |
| A3 | A3a | 0.40 | GA | 658 | 85 | 15 | 12.8 | 3.1 | Comparative example |
| B1 | B1a | 0.40 | GA | 610 | 88 | 12 | 14.5 | 4.2 | Inventive example |
| B2 | B2a | 0.40 | GA | 602 | 88 | 12 | 15.1 | 4.3 | Comparative example |
| C1 | C1a | 0.45 | GI | 640 | 57 | 13 | 9.8 | 2.1 | Inventive example |
| C2 | C2a | 0.45 | CR | 645 | 57 | 13 | 10.8 | 2.8 | Comparative example |
| C3 | C3a | 0.35 | GA | 608 | 89 | 11 | 8.8 | 2.5 | Inventive example |
| C4 | C4a | 0.70 | GA | 592 | 90 | 10 | 10.1 | 3.2 | Inventive example |
| D1 | D1a | 0.50 | GA | 606 | 88 | 12 | 11.5 | 3.4 | Inventive example |
| D2 | D2a | 0.50 | GA | 600 | 88 | 12 | 11.9 | 3.6 | Comparative example |
| E1 | E1a | 0.40 | CR | 616 | 86 | 14 | 14.3 | 3.6 | Comparative example |
| F1 | F1a | 0.40 | GA | <u>485</u> | <u>96</u> | <u>4</u> | 13.6 | 2.4 | Comparative example |
| G1 | G1a | 0.45 | GA | <u>714</u> | <u>74</u> | <u>26</u> | 12.5 | 3.8 | Comparative example |
| H1 | H1a | 0.45 | GA | 668 | 85 | 14 | 12.1 | 3.9 | Inventive example |
| I1 | I1a | 0.40 | GA | 655 | 85 | 14 | 11.8 | 4.0 | Inventive example |
| J1 | J1a | 0.50 | GA | 605 | 89 | 11 | 8.5 | 2.5 | Inventive example |
| K1 | K1a | 0.45 | GA | 612 | 88 | 12 | 9.0 | 2.9 | Inventive example |

The underline indicates that the underlined value fell out of its range according to the present invention or its preferable range.

For each of the resultant product sheet Nos. A1a to K1a, in the observation areas 11 and 12 at the ¼ sheet-thickness positions, Mn concentrations at 600 points (Mn concentrations D11 at 600 points) were measured by the method described above at measurement intervals of 1 μm in the rolling direction L at every 1 μm depth position in the sheet thickness direction T. Then, the rolling-direction average Mn concentration D12 at each depth position, and the overall age Mn concentrations D22, and the value Z2 {(maximum value-minimum value of rolling-direction average Mn concentrations D22)/overall average Mn concentration D23} were calculated.

For each of the resultant product sheet Nos. A1a to K1a, area fractions of hard phases connected together by 100 μm or more in the rolling direction L were measured by the method described above.

A surface roughness Wz of each of the product sheet Nos. A1a to K1a after the forming was measured. Note that the surface roughness Wz is a surface roughness of a steel sheet including no plating layer and is a surface roughness of a plating layer when a steel sheet includes the plating layer.

The surface roughness of a steel sheet after the forming was measured by the following method.

From a position away from an end face of the steel sheet by 100 mm or more, a JIS No. 5 test coupon was cut in a direction perpendicular to the rolling direction, and 5% tension strain was added. Next, a laser displacement measurement apparatus (VK-X1000 from KEYENCE) was used to measure 60 lines of profiles along a direction perpendicular to the rolling direction. At that time, an evaluation length was set to 10 mm, and wavelength components of 0.8 m or less and 2.5 m or more were removed. From the results, a maximum peak height (Wz) of a profile curve was determined in conformance with JIS B 0601:2001.

The results are shown in Table 5.

TABLE 5

| | | ¼ sheet-thickness position | | | | | ½ sheet-thickness position | |
| --- | --- | --- | --- | --- | --- | --- | --- | --- |
| Steel sheet No. | Product sheet No. | Overall average Mn concentration (%) | X1 | Maximum of rolling-direction average Mn concentration (%) | Minimum of rolling-direction average Mn concentration (%) | Z1 | Overall average Mn concentration (%) | X2 |
| A1 | A1a | 2.05 | 0.015 | 2.11 | 1.97 | 0.068 | 2.04 | 0.024 |
| A2 | A2a | 2.04 | 0.018 | 2.14 | 1.95 | 0.093 | 2.04 | 0.038 |
| A3 | A3a | 2.03 | 0.029 | 2.21 | 1.92 | 0.143 | 2.03 | 0.041 |
| B1 | B1a | 1.27 | 0.018 | 1.34 | 1.21 | 0.102 | 1.28 | 0.031 |
| B2 | B2a | 1.28 | 0.028 | 1.38 | 1.19 | 0.148 | 1.27 | 0.037 |
| C1 | C1a | 2.06 | 0.023 | 2.14 | 1.03 | 0.102 | 2.08 | 0.033 |
| C2 | C2a | 2.07 | 0.035 | 2.21 | 1.92 | 0.140 | 2.06 | 0.039 |
| C3 | C3a | 2.06 | 0.020 | 2.12 | 1.94 | 0.087 | 2.07 | 0.031 |
| C4 | C4a | 2.06 | 0.024 | 2.14 | 1.92 | 0.107 | 2.07 | 0.033 |
| D1 | D1a | 1.28 | 0.022 | 1.35 | 1.22 | 0.102 | 1.28 | 0.031 |
| D2 | D2a | 1.27 | 0.032 | 1.40 | 1.20 | 0.157 | 1.28 | 0.038 |
| E1 | E1a | 1.51 | 0.027 | 1.63 | 1.42 | 0.139 | 1.51 | 0.037 |
| F1 | F1a | 1.90 | 0.016 | 1.88 | 1.72 | 0.089 | 1.81 | 0.032 |
| G1 | G1a | 2.68 | 0.028 | 2.88 | 2.52 | 0.134 | 2.66 | 0.037 |
| H1 | H1a | 1.99 | 0.023 | 2.08 | 1.93 | 0.075 | 2.00 | 0.032 |
| I1 | I1a | 1.85 | 0.022 | 2.06 | 1.92 | 0.071 | 1.99 | 0.028 |
| J1 | J1a | 1.70 | 0.015 | 1.75 | 1.65 | 0.059 | 1.70 | 0.030 |
| K1 | K1a | 1.73 | 0.017 | 1.79 | 1.68 | 0.064 | 1.74 | 0.031 |

| | ½ sheet-thickness position | | | Area fraction | | |
| --- | --- | --- | --- | --- | --- | --- |
| Steel sheet No. | Maximum of rolling-direction average Mn concentration (%) | Minimum of rolling-direction average Mn concentration (%) | Z2 | of hard phases connected together by 100 μm or more in sheet thickness direction (%) | Surface roughness Wz (μm) | Remarks |
| A1 | 2.17 | 1.92 | 0.123 | 17 | 0.18 | Inventive example |
| A2 | 2.21 | 1.88 | 0.162 | 25 | 0.30 | Inventive example |
| A3 | 2.28 | 1.85 | 0.212 | 35 | 0.48 | Comparative example |
| B1 | 1.30 | 1.2 | 0.148 | 18 | 0.28 | Inventive example |
| B2 | 1.43 | 1.18 | 0.197 | 35 | 0.51 | Comparative example |
| C1 | 2.22 | 1.82 | 0.144 | 22 | 0.31 | Inventive example |
| C2 | 2.28 | 1.88 | 0.194 | 34 | 0.48 | Comparative example |
| C3 | 2.19 | 1.93 | 0.126 | 25 | 0.29 | Inventive example |
| C4 | 2.21 | 1.81 | 0.145 | 25 | 0.33 | Inventive example |
| D1 | 1.38 | 1.20 | 0.141 | 24 | 0.29 | Inventive example |
| D2 | 1.41 | 1.18 | 0.180 | 33 | 0.39 | Comparative example |
| E1 | 1.64 | 1.39 | 0.166 | 33 | 0.35 | Comparative example |
| F1 | 1.9 | 1.69 | 0.110 | 15 | 0.16 | Comparative example |
| G1 | 2.92 | 2.31 | 0.164 | 40 | 0.59 | Comparative example |
| H1 | 2.14 | 1.92 | 0.110 | 18 | 0.28 | Inventive example |
| I1 | 2.15 | 1.82 | 0.116 | 18 | 0.26 | Inventive example |
| J1 | 1.82 | 1.64 | 1.106 | 15 | 0.22 | Inventive example |
| K1 | 1.81 | 1.63 | 0.163 | 16 | 0.22 | Inventive example |

The underline indicates that the underlined value fell out of its range according to the present invention or its preferable range.

As shown in Table 1 to Table 5, surface roughnesses Wz of examples in each of which the chemical composition, the metal micro-structure, and the value X1 were all within their respective preferable ranges (inventive examples) were clearly smaller than surface roughnesses Wz in examples in each of which any one or more of the chemical compositions, the metal micro-structures, and the value X1 were out of their respective ranges according to the present invention (comparative examples). The inventive examples were excellent in strength and surface quality while having a thin sheet thickness and a light weight. In more detail, the inventive examples all had tensile strengths being more than 500 MPa and surface roughnesses Wz being 0.33 or less. In contrast, the comparative examples other than a product sheet No. Fla had surface roughnesses Wz being 0.35 or more and insufficient surface qualities. The product sheet No. Fla, which was a comparative example, had a small surface roughness but had a tensile strength not reaching 500 MPa, failing to have a required strength.

Figure 2:
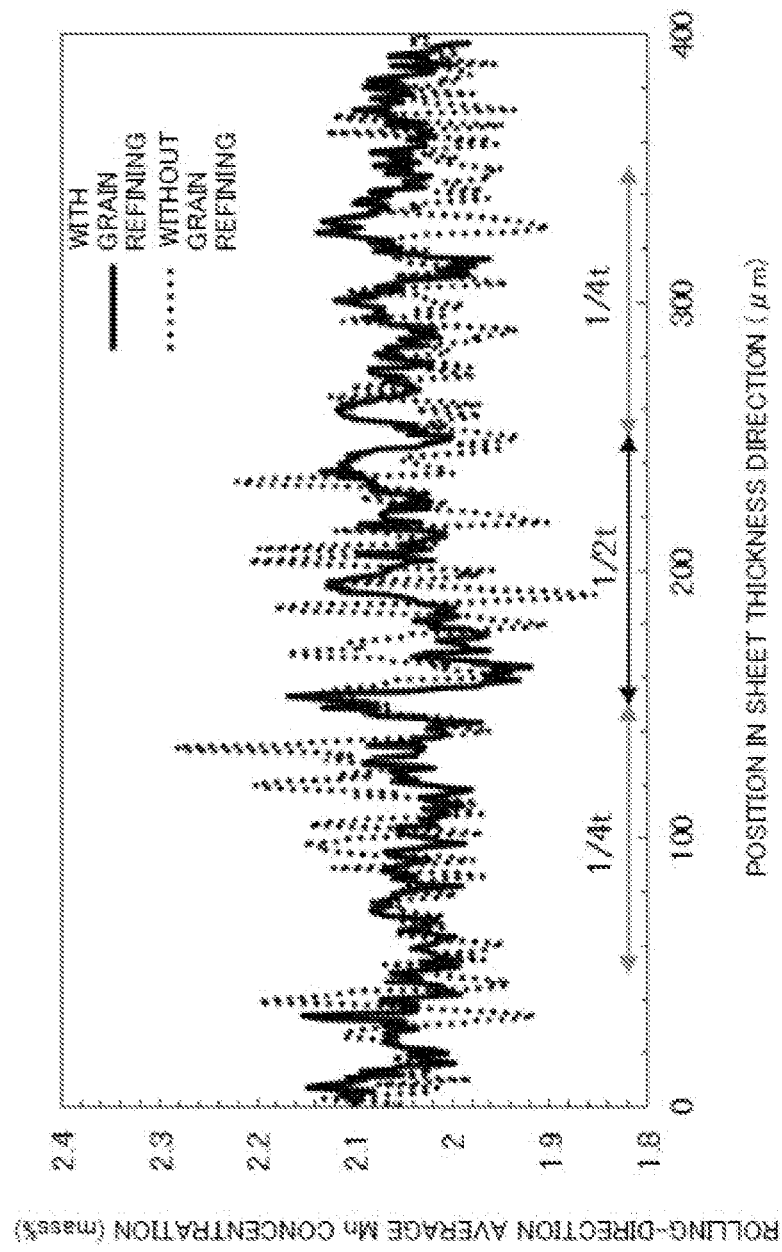
FIG. 2 is a graph illustrating rolling-direction average Mn concentrations at depth positions in the sheet thickness direction for the inventive examples and the comparative examples.

FIG. 2 is a graph illustrating rolling-direction average Mn concentrations D12 at depth positions in the sheet thickness direction for the inventive examples and the comparative examples. Referring to FIG. 2, for the product sheet Nos. A1a and A3a (inventive examples with the grain refining by direct rolling after solidification and a comparative example without the grain refining by direct rolling after solidification), rolling-direction average Mn concentrations D12 and D22 were measured by the method described above in areas that were 100 μm in the sheet thickness direction at a ¼ sheet-thickness position on a front surface side of each steel sheet, a ½ position of the steel sheet, and a ¼ sheet-thickness position on a back surface side of the steel sheet. It is understood that variations in row average Mn concentration of the inventive examples are clearly smaller than variations in row average Mn concentration of the comparative examples, at the ¼ sheet-thickness positions (in the observation areas 11 and 12) and at the ½ position (in the observation area 13). Therefore, in the inventive examples, an imbalance in Mn was small, and a fluctuation in Mn concentration attributable to microsegregation was small. The inventive examples thus succeeded to prevent the production of surface unevenness after the forming.

Figure 3:
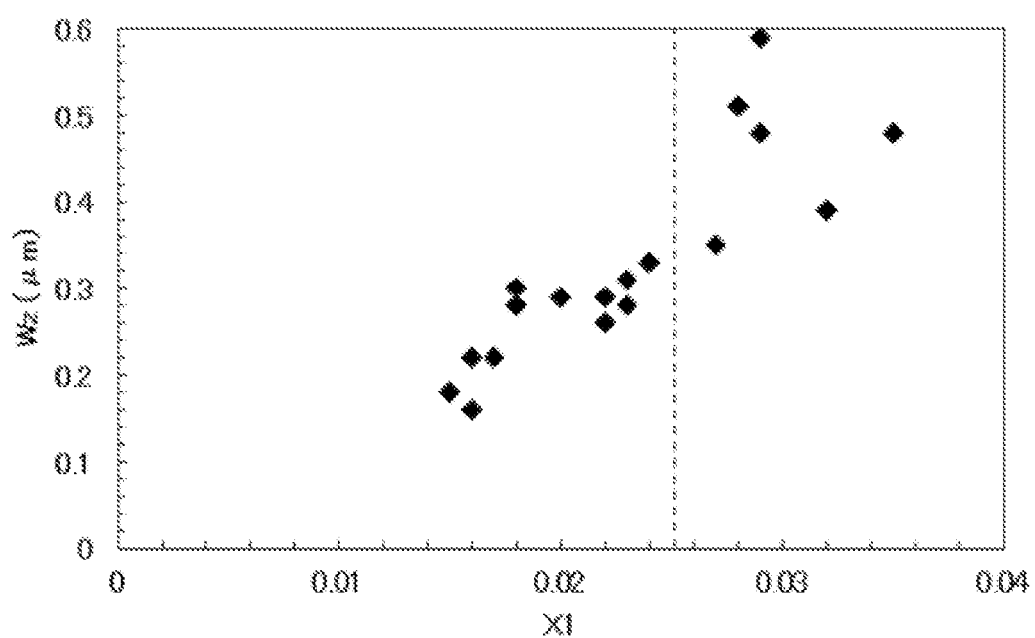
FIG. 3 is a graph illustrating a relation between Wz and a value X1, which is obtained by dividing the standard deviation of the rolling-direction average Mn concentrations at the ¼ sheet-thickness positions in the sheet thickness direction by the overall average Mn concentration at the ¼ sheet-thickness positions, for the inventive examples and the comparative examples.

FIG. 3 is a graph illustrating a relation between Wz and the value X1, which is obtained by dividing the standard deviation σ1 of the rolling-direction average Mn concentrations D12 at the ¼ sheet-thickness positions in the sheet thickness direction by the overall average Mn concentration D13 at the ¼ sheet-thickness positions, for the inventive examples and the comparative examples (the product sheet Nos. A1a to K1a). It was understood that X1 and Wz are in a proportional relation, the smaller X1 is, the smaller Wz is.

INDUSTRIAL APPLICABILITY

By the aspects according to the present invention, a steel sheet having a high strength and excellent appearance quality can be provided.

The invention claimed is:

1. A steel sheet comprising a chemical composition consisting of, in mass %:
C: more than 0.030% to 0.145%,
Si: 0% to 0.500%,
Mn: 0.50% to 2.50%,
P: 0% to 0.100%,
S: 0% to 0.020%,
Al: 0% to 1.000%,
N: 0% to 0.0100%,
B: 0% to 0.0050%,
Mo: 0% to 0.800%,
Ti: 0% to 0.200%,
Nb: 0% to 0.100%,
V: 0% to 0.200%,
Cr: 0% to 0.800%,
Ni: 0% to 0.250%,
O: 0% to 0.0100%,
Cu: 0% to 1.00%,
W: 0% to 1.00%,
Sn: 0% to 1.00%,
Sb: 0% to 0.200%,
Ca: 0% to 0.0100%,
Mg: 0% to 0.0100%,
Zr: 0% to 0.0100%, and
REM: 0% to 0.0100%,
with the balance being Fe and impurities, wherein
a metal micro-structures consisting of 70 to 95% of ferrite in volume fraction and 5 to 30% of hard phases in volume fraction, and
a value X1 obtained by dividing a standard deviation of average Mn concentrations in a rolling direction at ¼ sheet-thickness positions in a sheet thickness direction by an average Mn concentration at the ¼ sheet-thickness positions is 0.025 or less.

2. The steel sheet according to claim 1, wherein a value X2 obtained by dividing a standard deviation of average Mn concentrations in a rolling direction at ½ sheet-thickness positions in the sheet thickness direction by an average Mn concentration at the ½ sheet-thickness positions is 0.035 or less.

3. The steel sheet according to claim 1, wherein an area of hard phases connected together by 100 μm or more in the rolling direction is 30% or less of area of all hard phases in a region between ¼ sheet-thickness positions and a ½ sheet-thickness position.

4. The steel sheet according to claim 1, wherein an average grain diameter of the ferrite is 5.0 to 30 μm, and an average grain diameter of the hard phases is 1.0 to 5.0 μm.

5. The steel sheet according to claim 1, wherein a value Z1 obtained by dividing a difference between a maximum and a minimum of the average Mn concentrations in the rolling direction at the ¼ sheet-thickness positions in the sheet thickness direction by the average Mn concentration at the ¼ sheet-thickness positions is 0.110 or less.

6. The steel sheet according to claim 1, wherein a value Z2 obtained by dividing a difference between a maximum and a minimum of the average Mn concentrations in the rolling direction at the ½ sheet-thickness positions in the sheet thickness direction by the average Mn concentration at the ½ sheet-thickness positions is 0.150 or less.

7. The steel sheet according to claim 1, wherein the hard phases comprise one or more of martensite, bainite, tempered martensite, and pearlite.

8. The steel sheet according to claim 1, wherein a sheet thickness of the steel sheet is 0.20 mm to 1.00 mm.

9. The steel sheet according to claim 1, wherein the steel sheet is an automobile skin panel.

10. A steel sheet comprising a chemical composition comprising, in mass %:
C: more than 0.030% to 0.145%,
Si: 0% to 0.500%,
Mn: 0.50% to 2.50%,
P: 0% to 0.100%,
S: 0% to 0.020%,
Al: 0% to 1.000%,
N: 0% to 0.0100%, B: 0% to 0.0050%,
Mo: 0% to 0.800%,
Ti: 0% to 0.200%,
Nb: 0% to 0.100%,
V: 0% to 0.200%,
Cr: 0% to 0.800%,
Ni: 0% to 0.250%,
O: 0% to 0.0100%,
Cu: 0% to 1.00%,
W: 0% to 1.00%,
Sn: 0% to 1.00%,
Sb: 0% to 0.200%,
Ca: 0% to 0.0100%,
Mg: 0% to 0.0100%,
Zr: 0% to 0.0100%, and
REM: 0% to 0.0100%,
with the balance comprising Fe and impurities, wherein
a metal micro-structure comprising 70 to 95% of ferrite in volume fraction and 5 to 30% of hard phases in volume fraction, and
a value X1 obtained by dividing a standard deviation of average Mn concentrations in a rolling direction at ¼ sheet-thickness positions in a sheet thickness direction by an average Mn concentration at the ¼ sheet-thickness positions is 0.025 or less.

* * * * *